United States Patent [19]

Schäfer et al.

[11] 4,028,310

[45] June 7, 1977

[54] PROCESS FOR THE PRODUCTION OF POLYUREAS

[75] Inventors: Walter Schäfer; Kuno Wagner, both of Leverkusen; Hans-Jürgen Müller, Cologne, all of Germany

[73] Assignee: Bayer Aktiengesellschaft, Leverkusen, Germany

[22] Filed: July 18, 1975

[21] Appl. No.: 597,043

[30] Foreign Application Priority Data

July 30, 1974 Germany .......................... 2436740

[52] U.S. Cl. .......................................... 260/77.5 CH
[51] Int. Cl.² .......................................... C08G 18/06
[58] Field of Search ............................. 260/77.5 CH

[56] References Cited

UNITED STATES PATENTS

| 3,314,923 | 4/1967 | Muller et al. | 260/77.5 CH X |
| 3,578,639 | 5/1971 | Sheffer | 260/77.5 CH |
| 3,850,880 | 11/1974 | Hakanson et al. | 260/75 NE |

FOREIGN PATENTS OR APPLICATIONS 47-33279  8/1972  Japan .......................... 260/77.5 CH

*Primary Examiner*—Sandra M. Person

*Attorney, Agent, or Firm*—Gene Harsh; Lawrence S. Pope; Frederick H. Colen

[57] ABSTRACT

This invention relates to a process for the production of polyureas by reacting organic polyisocyanates with diamines, optionally in the presence of other polyfunctional compounds, i.e. polyfunctional in the isocyanate polyaddition context, having isocyanate-reactive hydrogen atoms, which is distinguished by the fact that the polyisocyanates used have an NCO-content of about 0.5 to 25%, by weight, and which, in addition, have an acylated urea group

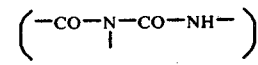

content of about 0.5 to 50% by weight and, optionally, a carbodiimide group (-N=C=N-) content of about 0 to 25% by weight.

The invention also relates to the use of the polyureas obtained by this process for the production of coatings, lacquer finishes and impregnations.

23 Claims, No Drawings

PROCESS FOR THE PRODUCTION OF POLYUREAS

SUMMARY OF THE INVENTION

The process according to the invention is essentially characterized by the use of new polyisocyanates containing acylurea groups and, optionally, carbodiimide groups in the polyisocyanate polyaddition reaction known per se carried out in the presence of diamine chain extenders known per se. This new principle according to the invention of producing polyisocyanate polyaddition products makes it possible to obtain high molecular weight compounds whose properties can be readily adjusted by selecting the organic radical attached through the acyl group to the new polyisocyanates. In cases where acyl urea polyisocyanates containing carbodiimide groups are used, it is possible by the process according to the invention, providing polyhydroxy polyesters are also used, to obtain polyester urethanes having hydrolysis stabilizers built into them (carbodiimides are known to be valuable hydrolysis stabilizers for plastics which contain ester groups).

The fact that the process according to the invention can be carried out at all is extremely surprising because acyl urea groups are known to react with amines by acylation (cf. for example B. F. Kurzer and K. Douraghi-Zadeh, Chem. Reviews 67, 107 (1967)) and so it had been expected that troublesome secondary reactions leading to the corresponding acyl amides would take place. However, secondary reactions of this kind do not take place in the process according to the invention.

The carbodiimide groups optionally present in the process according to the invention also remain substantially intact in the process according to the invention, although carbodiimides are known to react with primary or secondary amines to form guanidines (cf. for example P. W. Campbell, U.S. Pat. No. 2,941,966 (1960).

DETAILED DESCRIPTION OF THE INVENTION

Acylurea polyisocyanates suitable for use in the process according to the invention are, in particular, those which have a. an NCO-group content of from 0.5 to 25% by weight, preferably from 2 to 4 % by weight, b. a -CO-N-CO-NH-group content of 0.5 to 50% by weight, preferably from 3 to 12% by weight, and c. an —N=C=N—group content of from 0 to 25% by weight, preferably from 0.3 to 2% by weight.

Polyisocyanates of this kind can be obtained by reacting compounds containing isocyanate and carbodiimide groups with carboxylic acids in such quantities that from 0.2 to 1.2 gram equivalents of carboxyl groups are reacted per gram equivalent of carbodiimide groups.

carbodiimide isocyanates suitable for this purpose can be obtained in known manner by subjecting organic polyisocyanates to partial carbodiimide formation. This partial carbodiimide formation is preferably carried out by mixing the polyisocyanate with a suitable carbodiimide-forming catalyst, accompanied or followed by heating of the mixture. In general, the carbodiimide-forming reaction takes place at temperatures in the range of from 0° to 200° C. The carbodiimide-forming reaction can be carried out in the absence or even in the presence of suitable inert solvents. The degree of carbodiimide formation obtained during the carbodiimide-forming reaction can readily be determined from the quantity of carbon dioxide given off. The carbodiimide polyisocyanate obtained in this way is preferably reacted with the organic carboxylic acid in a one-pot reaction by adding the acid to the reaction mixture when the required degree of carbodiimide formation has been reached. This step can be carried out in the absence of or preferably in the presence of solvents. The reaction temperature is generally in the range from 0° to 150° C, preferably in the range from 20° to 80° C.

Polyisocyanates suitable for producing the new polyisocyanates used in the process according to the invention are any organic compounds containing at least two isocyanate groups. Preferred polyisocyanates are those corresponding to the general formula:

$$Q(NCO)_b$$

in which:

Q represents an aliphatic hydrocarbon radical with 2 to 18 carbon atoms, a cycloaliphatic hydrocarbon radical with 4 to 14 carbon atoms, an aromatic hydrocarbon radical with 6 to 14 carbon atoms or an araliphatic hydrocarbon radical with 7 to 14 carbon atoms, and b is 2 or 3.

The corresponding diisocyanates are particularly preferred. It is also possible to use modified polyisocyanates such as, for example, polyisocyanates containing biuret, allophanate, isocyanurate, urethane or carbodiimide groups. Another preferred group of the polyisocyanates used in the process according to the invention are reaction products containing isocyanate groups (NCO prepolymers) of the type which can be obtained in known manner by reacting the aforementioned polyisocyanates corresponding to the formula:

$$Q(NCO)_b$$ 

with deficits of polyhydroxyl compounds, more especially dihydroxy or trihydroxy alkanes having a molecular weight below 200, or with the polyhydroxy polyesters and polyethers known per se in polyurethane chemistry. Mixtures of the aforementioned polyisocyanates can of course also be used in the process according to the invention.

Suitable polyisocyanates are, for example, 1,4-tetramethylene diisocyanate, 1,6-hexamethylene diisocyanate, 1,12-dodecane diisocyanate, cyclohexane-1,3- and 1,4-diisocyanate or any mixture of these isomers, 1-isocyanato-3,3,5-trimethyl-5-isocyanato methyl cyclohexane, 1,3- and 1,4-phenylene diisocyanate, 2,4- and 2,6-tolylene diisocyanate or any mixture of these isomers, m-xylylene diisocyanate, 2,4- and 2,6- hexahydro tolylene diisocyanate or any mixture of these isomers, 4,4'-diisocyanato dicyclohexyl methane, diphenyl methane-4,4'-diisocyanate, naphthylene-1,5-diisocyanate, polyisocyanates containing carbodiimide isocyanate adducts of the kind obtained in accordance with German Pat. Specification No. 1,092,007, (corresponds to U.S. Pat. No. 3,152,162) diisocyanates of the type described in U.S. Pat. No. 3,492,330, polyisocyanates containing allophanate groups of the type described in British Patent Specification No. 994,890, Belgian Patent Specification No. 761,626 and published Dutch Patent Application No. 7,102,524, polyisocyanates containing isocyanurate groups of the type described in German patent Nos. 1,022,789 and 1,027,394 and in German Offenlegungsschrifts No. 1,929,034 2,004,048, (corresponds to South African Patent 70 00438-9) polyisocyanates containing biuret groups of the type described in German Patent Specification No. 1,101,394, in U.S. Pat. No. 3,124,605, in British Pat. Specification No. 889,050 and in French Patent Specification No. 7,017,514, (corresponds to U.S. Ser. No. 036,500, filed May 11, 1970) polyisocyanates obtained by telomerization reactions of the type described in Belgian Patent Specification No. 723,640, polyisocyanates containing ester groups according to British Patent Specification Nos. 956,474 and 1,072,956, (corresponds to U.S. Pat. No. 3,281,378) aliphatic, cycloaliphatic, araliphatic or aromatic polyisocyanates of the type mentioned by W. Siefgen in Justus Liebig's Annalen der Chemie, 562, pages 75 to 136, reaction products of the aforementioned isocyanates with acetals according to German Patent Specification 1,072,385, (corresponds to U.S. Pat. No. 3,120,502) isocyanates of the kind mentioned in German Patent Specifications Nos. 1,002,789 and 1,027,394.

In general, it is particularly preferred to use the commercially readily available polyisocyanates, for example 2,4- and 2,6-tolylene diisocyanate or any mixture of these isomers, and polyphenyl-polymethylene-polyisocyanates of the type obtained by condensing aniline with formaldehyde, followed by phosgenation.

Other preferred isocyanates include 1,4-tetramethylene diisocyanate, 1,6-hexamethylene diisocyanate, 1-isocyanato-3,3,5-trimethyl-5-isocyanoato methyl cyclohexane, m-xylylene diisocyanate and 4,4'-diisocyanato dicyclohexyl methane, 4,4'-diisocyanato diphenyl methane, 1,3-phenylene diisocyanate, 1,4-phenylene diisocyanate, 4,4'-diisocyanate diphenyl ether, 1,5-naphthylene diisocyanate, 1-methoxyphenyl-2,4-diisocyanate, 4,4'-biphenylene diisocyanate, 3,3'-dimethoxy-4,4'-biphenyl diisocyanate, 3,3'-dimethyl-4,4'-biphenyl diisocyanate, 3,3'-dimethyl-diphenyl methane 4,4'-diisocyanate.

Polyhydroxyl compounds suitable for the production of equally preferred NCO-prepolymers are, in particular, alkane diols and triols having a molecular weight below about 200 such as, for example, ethylene glycol, propylene glycol, hexamethylene diol, glycerol, trimethylol propane, trimethylol ethane or mixtures of these compounds. It is particularly preferred to use polyhydroxyl polyesters or polyethers, especially dihydroxyl polyesters or polyethers having molecular weights in the range from about 400 to 4000 of the type obtained in known manner by reacting polybasic acids such as, for example, adipic acid, phthalic acid, tetrahydrophthalic acid or hexahydrophthalic acid, with excess quantities of the alkane diols or triols mentioned by way of example above or by the alkoxylation of suitable starter molecules such as, for example, water, ammonia, aniline or the alkane diols and triols mentioned by way of example above with alkylene oxides such as, for example, ethylene oxide and/or propylene oxide.

In addition to these preferred NCO prepolymers, it is also possible to use NCO prepolymers of the kind obtained by reacting the isocyanates mentioned by way of example with deficits of polyester amides, polythio ethers, polyurethanes, polyacetals or polycarbonates containing hydroxyl, sulphydryl or amino groups.

In one particularly preferred modification of the process according to the invention, diisocyanates, preferably aliphatic diisocyanates of the kind mentioned above, are initially reacted with polyhydroxyl compounds of the aforementioned kind in known manner with an NCO/OH ratio of the reactants of about 1.5 to 2.3, preferably about 1.8 to 2, to form the prepolymer, followed by the addition of a preferably aromatic diisocyanate of the aforementioned kind, preferably in one to three times the molar quantity, based on the diisocyanate used for prepolymer formation. Following the addition of a suitable carbodiimide forming catalyst, the carbodiimide-forming reaction is initiated as described above at temperatures of from about 0° to 200° C and the carboxylic acid added dropwise when the required degree of carbodiimide formation is reached. This is followed by chain extension in accordance with the invention.

Carboxylic acids suitable for reaction with the carbodiimide polyisocyanates are, in particular, carboxylic acids corresponding to the general formula:

in which:
R preferably represents an optionally olefinically unsaturated aliphatic hydrocarbon radical with 1 to 19 carbon atoms, an optionally olefinically unsaturated cycloaliphatic hydrocarbon radical with 6 to 14 carbon atoms, an aromatic hydrocarbon radical with 6 to 14 carbon atoms or an araliphatic hydrocarbon radical with 7 to 14 carbon atoms, and
$a$ is an integer from 1 to 3, preferably 1 or 2.

Particularly preferred carboxylic acids are those corresponding to the above general formula in which R represents an aliphatic hydrocarbon radical with 1 to 19 carbon atoms, and $a = 1$. Generally however, it can be said that any organic compounds having free carboxyl groups and no other groups likely to interfere with the reaction according to the invention are suitable. Examples of these carboxylic acids include formic acid, acetic acid, chloroacetic acid, phenylacetic acid, propionic acid, lauric acid, palmitic acid, stearic acid, cyclohexane carboxylic acid, acrylic acid, methacrylic acid, crotonic acid, sorbic acid, 10-undecenoic acid, oleic acid, linoleic acid, abietic acid, cinnamic acid, 4-dimethyl amino benzoic acid or even monoesters or monoamides of various dicarboxylic acids, such as oxalic acid, malonic acid, succinic acid, maleic acid, fumaric acid, phthalic acid, reaction products of $C_4H_9-O-(CH_2-CH_2-O)_{10-100}-CH_2-CH_2OH$ with cyclic anhydrides to form high molecular weight monocarboxylic acid semiesters, and also polycarboxylic acids such as oxalic acid, malonic acid, succinic acid, glutaric acid, adipic acid, suberic acid, azelaic acid, sebacic acid, 2,2,4- and 2,4,4-trimethyl adipic acid, heptadecane-1,8- and 1,9-dicarboxylic acid, fumaric acid, benzene-1,3- and 1,4- dicarboxylic acid, 1,2,2-trimethylcyclopentane-1,3-dicarboxylic acid.

Suitable carbodiimide-forming catalysts are described, for example, in U.S. Pat. Nos. 2,941,966, 2,853,518 and 2,853,473. The catalyst preferably used is a mixture of 1-methyl-1-phospha-2-cyclopenten-1-oxide and 1-methyl-1-phospha-3-cyclopenten-1-oxide. In addition to phosphorus compounds of this kind, it is also possible to use other carbodiimide forming catalysts known per se.

In one preferred modification of the process for producing the polyisocyanate-polycarbodiimide polyaddition product, preferably aromatic diisocyanates are subjected to carbodiimide formation with about 1/100 to 2/10 of the molar quantity of the aromatic diisocyanate of phospholine oxide at temperatures in the range from about 0° to 200° C preferably from about 20° to 100° C. In order to obtain products stable in storage at room temperatures, it is advisable to carry out the carbodiimide-forming reaction at temperatures in the range from about 100° to 200° C. in the presence of catalysts, of. for example I. I. Monagle, I. org. Chemistry 27 3851 (1962) which only develop their catalytic activity at temperatures in this high range. However, since the modified polyisocyanate used in the process of the invention are preferably subjected to the isocyanate polyaddition reaction shortly subsequent to their formation there is normally no special interest in such storage stability at room temperature of the intermediate modified polyisocyanate. After the evolution of carbon dioxide has reached about 50 to 95 mol % of the theoretical (100 % means complete conversion of the NCO groups into carbodiimide groups), the carboxylic acid corresponding to the general formula R—(COOH)$_a$ is added dropwise. The quantity in which this acid is added is such that there are from about 0.2 to 1.2, preferably from about 0.5 to 1.2, mols of carboxyl groups per mol of carboxyl groups per mol of carbon dioxide liberated.

Aliphatic and cycloaliphatic diisocyanates also react to form polycarbodiimides, although temperatures above about 100° C are generally required to obtain a conversion comparable with that obtained in the case of aromatic isocyanates.

As already mentioned, both the carbodiimide-forming reaction and the addition reaction can be carried out in the presence or even in the absence of solvents. Examples of suitable solvents are benzene, toluene, xylene, cyclohexane, tetralin, chlorobenzene, o-dichlorobenzene, dimethylformamide, methylene chloride, chloroform, perchlorethylene, ethyl acetate, butyl acetate, diethylene glycol dimethyl ether, tetrahydrofuran, isopropanol, tert.-butanol, acetone, methyl ethyl ketone, methyl isopropyl ketone, cyclohexanone, methylene and solvent mixtures. The polyisocyanate polyaddition product prepared in the absence of solvents often hardens into a hard foam which, after having been ground into a powder, can still be dissolved after several days' storage at room temperature in such solvents as toluene, xylene, methylene chloride, o-dichloro benzene or dimethylformamide, and used for the process according to the invention.

The NCO-content of the modified polyisocyanates can be quantitatively determined by the titration method known per se using a secondary amine, for example dibutyl amine. The product dissolved in an inert solvent, for example o-dichloro benzene, is reacted at room temperature with an excess of dibutyl amine. The amine consumption which can be subsequently determined by titration corresponds to the quantity of isocyanate groups present in the end products because guanidine groups are formed from the carbodiimide groups and the secondary amine and can also be titrated for example with hydrochloric acid, so that they do not enter into the overall balance of titrimetric NCO-determination.

In order to determine the carbodiimide groups, reaction of the products with a secondary amine is followed by removal of the excess amine and of the solvent by distillation. The guanidine groups formed are then directly determined quantitatively by titration, for example with hydrochloric acid. Titration is not affected by the urea groups formed (isocyanate groups plus secondary amine).

The acylated urea group content of the products can be calculated from the difference in the carbodiimide content before and after the reaction according to the invention with carboxylic acids. The fact that, during carboxylic acid modification, the expected reaction resulting in the formation of acyl urea groups takes place between the carbodiimide groups and the carboxyl groups, can be seen from the IR bands at 1720 cm$^{-1}$ and 1660 cm$^{-1}$ which can always be observed in the end products according to the invention and which are typical of acyl urea groups.

It is particularly preferred in the process according to the invention to use diisocyanates having the aforementioned requirements with respect to NCO-content acylated urea content and carbodiimide content. Diisocyanates of this kind are formed in cases where difunctional starting isocyanates or NCO polymers and monocarboxylic acids are used for the production described above of the modified polyisocyanates employed in accordance with the invention.

As already mentioned, one of the major advantages of the process according to the invention is that the properties of the end products according to the invention can readily be varied by selecting the organic radical attached through the acyl group, i.e. by suitably selecting the carboxylic acid used in the production of the modified polyisocyanates essential to the invention. One particular advantage is, for example, the fact that the properties of the end products according to the invention, especially in regard to their thermoplastic properties and solubility in a variety of different solvents, can readily be controlled by suitably selecting the carboxylic acids. Fatty acid radicals, for example in the range from $C_{12}$ to $C_{18}$, considerably increase solubility in apolar solvents, such as toluene. In addition, this makes it possible to produce polymer solutions of increased solids concentration.

Another advantage is the fact that additional functional groups can readily be introduced during the carboxylic acid addition to the carbodiimide groups. For example, crosslinkable groups can be incorporated into the end products according to the invention by using unsaturated carboxylic acids.

The radicals attached through the acyl group of the modified polyisocyanates to be used in the process according to the invention also act as "spacers" between the individual polymer chains of the end products according to the invention, and would appear to contribute towards suppressing undesirable secondary reactions such as addition reaction between two carbodiimide groups under formation of four-membered rings thus leading to undesirable crosslinking effects. This would seem to be another explanation of the favourable fact that, where compounds which are difunctional in the isocyanate polyaddition context are used, the process according to the invention leads to high molecular weight film-forming compounds which are soluble in conventional lacquer solvents, more especially aromatic hydrocarbons.

In the process according to the invention, the described, modified polyisocyanates essential to the invention are reacted in solvents of the kind mentioned above with reference to the production of the modified polyisocyanates with diprimary, disecondary or primary-secondary diamines in an NCO:NH molar ratio of about 0.8 : 2 to 1.1 : 1, preferably about 1 : 1, at temperatures in the range from about 0° to 80° C, preferably at temperatures in the range from about 15° to 30° C.

In order further to modify the end products, the incorporation of polyhydroxyl compounds known per se in polyurethane chemistry, especially having molecular weights in the range from about 400 to 4000, of the type previously referred to with reference to the production of the modified polyisocyanates to be used in accordance with the invention, may either be carried out in the same way as described above by initially preparing a prepolymer from low molecular weight polyisocyanate and relatively high molecular weight polyhydroxyl compound and subsequently subjecting that prepolymer to partial carbodiimide formation, followed by modification with carboxylic acid, or by initially subjecting a low molecular weight starting polyisocyanate to partial carbodiimide formation, subsequently modifying it with carboxylic acid and finally reacting the intermediate product obtained in this way with a deficit of the aforementioned relatively high molecular weight polyhydroxyl compounds to form the corresponding prepolymers which, finally, are used in the process according to the invention. Preferably mixtures of monomeric diisocyanates and NCO-prepolymers obtained by reacting diisocyanates with aforementioned polyhydroxyl compounds at molar NCO/OH ratios of about 2:1 to 15:1 are subjected to the carbodiimidazation reaction.

Examples of diamines suitable for use in the process according to the invention (in the context of the invention, diamines also include hydrazines), are in particular those corresponding to the formula:

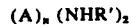

in which:
A represents an aliphatic hydrocarbon radical with 2 to 18 carbon atoms, an aromatic hydrocarbon radical with 6 to 15 carbon atoms, a cycloaliphatic hydrocarbon radical with 5 to 15 carbon atoms or an araliphatic hydrocarbon radical with 7 to 15 carbon atoms,
R' represents hydrogen or an aliphatic hydrocarbon radical with 1 to 4 carbon atoms, and
n = 0 or 1.

Examples of diamines of this kind preferably used in the process according to the invention include hydrazine hydrate, hydrazine, N-methyl hydrazine, N,N-dimethyl and diethyl hydrazine, ethylene diamine, trimethylene diamine, 1,2-propylene diamine, tetramethylene diamine, N-methyl-1,3-propylene diamine, pentamethylene diamine, trimethyl hexamethylene diamine, hexamethylene diamine, octamethylene diamine, undecamethylene diamine, diaminomethyl cyclobutane, 1,4-diamino cyclohexane, 1,4-diamino dicyclohexyl methane, 1-methyl-2,4-diamino cyclohexane, 1-methyl-2,6-diamino cyclohexane, m-xylylene diamine 1-amino-3,3,5-trimethyl-5-aminomethyl cyclohexane, p-amino benzyl amine, hexahydrobenzidine, p-phenylene diamine, 2,4-tolylene diamine, 1,3,5-triisopropyl-2,4-phenylene diamine, 1,3,5-trimethyl-2,4-phenylene diamine, 1-methyl-3,5-diethyl-2,4-phenylene diamine, 1-methyl-3,5-diethyl-2,4-phenylene diamine, 1-methyl-3,5-diethyl-2,6-phenylene diamine, 4,4'diamino diphenyl methane. It is particularly preferred to use hydrazine hydrate, N,N-dimethyl hydrazine, 1-amino-3,3,5-trimethyl-5-aminomethyl cyclohexane, hexamethylene diamine, m-xylylene diamine, 4,4-diamino dicyclohexyl methane, trimethyl hexamethylene diamine or 1-methyl-2,4-diamino cyclohexane. In addition to these preferred and particularly preferred diamines, it is also possible to use in the process according to the invention analogues of the aforementioned diamines containing inert substituents, such as for example 3-chloro-4-amino benzyl amine, 2,5-dichloro-1,4-diamino benzene, 3,3'-dichloro-4,4'-diamino diphenyl methane, 4,4'-diamino diphenyl ether, 3,3'-carboethoxy-4,4'-diamino diphenyl methane or lysine methyl ester.

In the process according to the invention, the diamines can also be used in the form of lactam adducts. Lactam-diamine adducts of this kind are very much more reactive than free diamines (DT-OS 2,117,576, US-PS 3,758,444).

Polymers having a high concentration of urea segments are obtained in the process according to the invention. As already mentioned, it is possible by suitably selecting the functionality of the starting compounds and the type of organic radical introduced through the acyl group to obtain end products according to the invention which are readily soluble in conventional lacquer solvents, more especially aromatic hydrocarbon solvents or mixtures thereof with alcohols, such as tert.butanol or isopropanol, and which can be directly converted from these solutions by film formation to form coatings, lacquer finishes and films. By virtue of the high concentration of urea groups, the sheet structures obtained in this way show outstanding mechanical strength values.

The end products of the process according to the invention can also be obtained in powder form from solutions of this kind by methods known per se. In powder form, the end products of the process according to the invention are suitable for use as binders for powder lacquers or even as binders for physically drying coating agents which can be transported in dry form and redissolved in the aforementioned solvents as and when required. Suitable substrates for sheet structures produced from the end products of the process according to the invention are, for example, natural or synthetic textiles, plastics or leather. By virtue of the fact that it is possible in accordance with the invention to vary the properties of the end products, feel, surface hardness, resistance to friction and other macroscopic properties of the sheet structures ultimately obtained can readily be adapted to suit the particular application.

In order that those skilled in the art may better understand how the present invention may be practiced, the following examples are given by way of illustration and not by way of limitation.

EXAMPLE 1

172 parts by weight (0.1 mol) of an adipic acid-1, 6-hexane diol neopentyl glycol polyester having an OH number of 65 are dehydrated for 30 minutes in a water jet vacuum at a temperature of 120° C, and subsequently reacted for 30 minutes at that temperature with 44.4 parts by weight (0.2 mol) of 1-isocyanato-3,3,5-trimethyl-5-isocyanato methyl cyclohexane.

After cooling to 50° C, the prepolymer is diluted with 585 parts by weight of dimethyl formamide. 34.8 parts by weight (0.2 mol) of a mixture of 2,4-tolylene and 2,6-tolylene diisocyanate in a ratio of 8 : 2, and 2.4 parts by weight (0.02 mol) of a mixture of 1-methyl-1-phospha-2-cyclopenten-1-oxide and 1-methyl-1-phospha-3-cyclopenten-1-oxide, are added to the resulting solution. When the amount of liberated carbon dioxide reaches 95% of the theoretical 12 parts by weight (0.2 mol) of acetic acid in 12 parts by weight of dimethyl formamide are slowly added at 80° C, followed by stirring until a clear solution is formed.

Analysis of the dissolved product (all percentages relate to the solid substance):

| | |
|---|---|
| —NCO: | 3.4% by weight |
| —N=C=N—: | 0.9% by weight |
| —CO—N—CO—NH—: | 4.7% by weight |

Chain extension with 16.3 parts by weight (0.096 mol) of 1-amino-3,3,5-trimethyl-5-aminomethyl cyclohexane in 100 parts by weight of dimethyl formamide at a temperature of 25° C gives a solution of a polyurethane acyl urea which contains approximately 30% of high molecular weight solids and has a viscosity of 1208 cP at 24° C.

EXAMPLE 2

200 parts by weight (0.1 mol) of an adipic acid ethylene glycol polyester having an OH number of 56 are dehydrated for 30 minutes in a water jet vacuum at a temperature of 120° C, and subsequently reacted for 30 minutes at that temperature with 44.4 parts by weight (0.2 mol) of 1-isocyanato-3,3,5-trimethyl-5-isocyanato methyl cyclohexane.

After cooling to 70° C, the prepolymer is diluted with 479 parts by weight of toluene. 34.8 parts by weight (0.2 mol) of a mixture of 2,4-tolylene- and 2,6-tolylene diisocyanate in a ratio of 8 : 2 and 2.4 parts by weight (0.02 mol) of a mixture of 1-methyl-1-phospha-2-cyclopenten-1-oxide and 1-methyl-1-phospha-3-cyclopenten-1-oxide, are added to the resulting solution. After 4.15 liters of carbon dioxide have been given off at 70° C, 12 parts by weight (0.2 mol) of acetic acid in 12 parts by weight of toluene are slowly added dropwise at a temperature of 70° C.

Analysis of the dissolved product (all percentages relate to the solid substance):

| | |
|---|---|
| —NCO: | 3.0% by weight |
| —N=C=N—: | 0.3% by weight |
| —CO—N—CO—NH—: | 5.3% by weight |

20.5 parts by weight of caprolactam dissolved in 84.5 parts by weight of isopropanol are then added, followed by chain extension with 15.9 parts by weight (0.094 mol) of 1-amino-3,3,5-trimethyl-5-aminomethyl cyclohexane in 93 parts by weight of isopropanol. A solution of a polyurethane acyl urea having a viscosity of 15,800 cP at 24° C is obtained.

EXAMPLE 3

Preparation of the polyester diisocyanate prepolymer and carbodiimide formation are carried out in the same way as in Example 1. The acetic acid is replaced by 24.4 parts by weight (0.2 mol) of benzoic acid dissolved in 24.4 parts by weight of dimethyl formamide. Chain extension with 14.1 parts by weight (0.083 mol) of 1-amino-3,3,5-trimethyl-5-aminomethyl cyclohexane at a temperature of 25° C gives a gel which readily dissolves in cold dimethyl formamide.

EXAMPLE 4

Production of the polyester diisocyanate prepolymer and carbodiimide formation are carried out as in Example 1. The acetic acid is replaced by 14.4 parts by weight (0.2 mol) of acrylic acid dissolved in 14.4 parts by weight of dimethyl formamide. Chain extension with 17 parts by weight (0.1 mol) of 1-amino-3,3,5-trimethyl cyclohexane in 100 parts by weight of dimethyl formamide at a temperature of 25° gives a gel which dissolves in cold dimethyl formamide.

EXAMPLE 5

Production of the polyester diisocyanate prepolymer and carbodiimide formation are carried out as in Example 1. The acetic acid is replaced by 29.6 parts by weight (0.2 mol) of cinnamic acid dissolved in 30 parts by weight of dimethyl formamide. After the addition of another 265 parts by weight of dimethyl formamide and chain extension with 16.3 parts by weight (0.096 mol) of 1-amino-3,3,5-trimethyl-5-aminomethyl cyclohexane in 100 parts by weight of dimethyl formamide at 25° C, a solution is obtained which has a viscosity of 2000 cP at 24° C.

EXAMPLE 6

Production of the aliphatic polyester diisocyanate prepolymer is carried out as in Example 1.

After the prepolymer has been cooled to 50° C, 695 parts by weight of dimethyl formamide and 44.4 parts by weight (0.2 mol) of 1-isocyanato-3,3,5-trimethyl-5-isocyanato methyl cyclohexane are added. 34.8 parts by weight (0.2 mol) of a mixture of 2,4-and 2,6-tolylene diisocyanate in a ratio of 8 : 2, and 2.4 parts by weight (0.02 mol) of a mixture of 1-methyl-1-phospha-2-cyclopenten-1-oxide and 1-methyl-1-phospha-3-cyclopenten-1-oxide, are added to the resulting solution. When the evolution of carbon dioxide has virtually stopped, 17.2 parts by weight (0.2 mol) of methacrylic acid in 17.2 parts by weight of dimethyl formamide are added, followed by stirring at 80° C until a clear solution is formed. Chain extension with 48 parts by weight (0.28 mol) of 1-amino-3,3,5-trimethyl-5-aminomethyl cyclohexane in 100 parts by weight of dimethyl formamide at 25° C gives a solution of a polyurethane acyl urea having a viscosity of 1650 cP at 24° C.

EXAMPLE 7

Production of the aliphatic polyester diisocyanate prepolymer is carried out in the same way as in Example 1.

After the prepolymer has been cooled to 70° C, 365 parts by weight of xylene are added. 34.8 parts by weight (0.2 mol) of a mixture of 2,4- and 2,6-tolylene diisocyanate in a ratio of 8 : 2, and 1.5 parts by weight (0.0125 mol) of a mixture of 1-methyl-1-phospha-2-cyclopenten-1-oxide and 1-methyl-1-phospha-3-cyclopenten-1-oxide, are added to the resulting solution. After 4.17 liters of carbon dioxide have been given off at 70° C, a solution of 40 parts by weight of lauric acid (0.2 mols) dissolved at 70° C in 40 parts by weight of xylene is slowly added dropwise to the reaction mixture.

Analysis of the dissolved product (all percentages relate to the solid substance):

| | |
|---|---|
| —NCO: | 3.1% by weight |
| —N=C=N—: | 0.8% by weight |
| —CO—N—CO—NH—: | 4.2% by weight |
| \| | |

216 parts by weight of dimethyl formamide are then stirred in, followed by chain extension at room temperature (25° C) with 15.5 parts by weight (0.091 mol) of 1-amino-3,3,5-trimethyl-5-aminomethyl cyclohexane in 100 parts by weight of xylene. The solution contains approximately 30% of high molecular weight solids and has a viscosity of 4100 cP at 24° C.

EXAMPLE 8

The reaction is carried out in the same way as in Example 7, except that the mixture of 2,4- and 2,6-tolylene diisocyanate is replaced by 50 parts by weight (0.2 mol) of diphenyl methane-4,4'-diisocyanate. Chain extension with 17 parts by weight (0.1 mol) of 1-amino-3,3,5-trimethyl-5-aminomethyl cyclohexane gives a solution of a polyurethane acyl urea having a viscosity of 910 cP at 24° C.

EXAMPLE 9

200 parts by weight (0.1 mol) of a propylene glycol polyether having an OH number of 56 are dehydrated for 30 minutes in a water jet vacuum at 130° C, cooled to 110° C, followed by the addition of 0.02 parts by weight of tin II octoate and 44.4 parts by weight (0.2 mol) of 1-isocyanato-3,3,5-trimethyl-5-isocyanato methyl cyclohexane. After 20 minutes, the reaction product is cooled to 70° C and diluted with 411 parts by weight of toluene. 34.8 parts by weight (0.2 mol) of a mixture of 2,4- and 2,6-tolylene diisocyanate in a ratio of 8 : 2, and 1.5 parts by weight (0.013 mol) of a mixture of 1-methyl-1-phospha-2-cyclopenten-1-oxide and 1-methyl-1-phospha-3-cyclopenten-1-oxide, are added to the resulting solution. After 2 hours at 70° C, the evolution of carbon dioxide virtually ceases, and 40 parts by weight (0.2 mol) of lauric acid in 40 parts by weight of toluene are slowly added dropwise at 70° C.

Analysis of the dissolved product (all percentages relate to solid substance):

| | |
|---|---|
| —NCO: | 2.8% by weight |
| —N=C=N—: | 0.2% by weight |
| —CO—N—CO—NH—: | 4.8% by weight |
| \| | |

After 237 parts by weight of tert.butanol have been stirred in, the product is chain extended with 14 parts by weight (0.082 mol) of 1-amino-3,3,5-trimethyl-5-aminomethyl cyclohexane in 100 parts by weight of toluene at a temperature of 25° C. The solution has a viscosity of 4100 cP at 24° C.

EXAMPLE 10

Production of the aliphatic polyester diisocyanate prepolymer is carried out as in Example 1.

After the prepolymer has been cooled to 70° C, 447 parts by weight of toluene are added. 34.8 parts by weight (0.2 mol) of a mixture of 2,4- and 2,6-tolylene diisocyanate in a ratio of 8 : 2, and 2.4 parts by weight (0.02 mol) of a mixture of 1-methyl-1-phospha -2-cyclopenten-1-oxide and 1-methyl-1-phospha-3-cyclopenten-1-oxide, are added to the resulting solution. After 4.3 liters of carbon dioxide have been given off, a solution of 40 parts by weight of lauric acid (0.2 mol) dissolved in 40 parts by weight of toluene is slowly added dropwise to the reaction mixture at a temperature of 70° C.

Analysis of the dissolved product (all percentages relate to solid substance):

| | |
|---|---|
| —NCO: | 3.1% by weight |
| —N=C=N—: | 0.7% by weight |
| —CO—N—CO—NH—: | 4.4% by weight |
| \| | |

160 parts by weight of tert.butanol are then stirred in at room temperature, followed by chain extension with 5 parts by weight (0.1 mol) of hydrazine hydrate in 50 parts by weight of tert.butanol. Heating for 2 hours at 50° C gives a solution having a viscosity of 2500 cP at 24° C.

EXAMPLE 11

A mixture of an aromatic polyesterdiisocyanate prepolymer and a monomeric aromatic diisocyanate prepared over a period of 30 minutes at 120° C from 34.8 parts by weight (0.2 Mol) of a mixture of 2,4- and 2,6-tolylene diisocyanate and 34 parts by weight (0.02 mol) of an adipic acid-1,6-hexane diol neopentylglycol polyester, is added to 216,4 parts by weight of the aliphatic polyester diisocyanate prepolymer mentioned in Example 1. This mixture is diluted with 318 parts by weight of toluene and subjected to carbodiimide formation with 2.4 parts by weight (0.02 mol) of phospholine oxide at a temperature of 70° C. After just 4 liters of carbon dioxide have been given off, a solution of 40 parts by weight (0.2 mol) of lauric acid dissolved in 40 parts by weight of toluene is slowly added dropwise at 70° C.

Analysis of the dissolved product (all percentages relate to solid substance):

| | |
|---|---|
| —NCO: | 2.7% by weight |
| —N=C=N—: | 0.5% by weight |
| —CO—N—CO—NH—: | 4.1% by weight |
| \| | |

After 240 parts by weight of tert.-butanol have been stirred in, the product is chain-extended with 17 parts by weight (0.1 mol) of 1-amino-3,3,5-trimethyl-5-aminomethyl cyclohexane in 200 parts by weight of toluene at a temperature of 25° C. The resulting solution has a viscosity of 1500 cP at 24° C.

EXAMPLE 12

Production of the aliphatic polyester diisocyanate prepolymer is carried out as in Example 1.

After cooling to 50° C, the prepolymer is diluted with 585 parts by weight of toluene. 34.8 parts by weight of toluene. 34.8 parts by weight (0.2 mol) of a mixture of 2,4- and 2,6-tolylene diisocyanate in a ratio of 8 : 2, and 2.4 parts by weight (0.02 mol) of a mixture of 1-methyl-1-phospha -2-cyclopenten-1-oxide and 1-methyl-1-phospha -3-cyclopenten-1-oxide, are added to the resulting solution. After 4.36 liters of carbon dioxide have been given off at 80° C, 56.8 parts by weight of stearic acid (0.2 mol) in 133 parts by weight of toluene are slowly added.

Analysis of the dissolved product (all percentages relate to solid substance):

| | |
|---|---|
| —NCO: | 3.0% by weight |
| —N=C=N—: | 0.7% by weight |
| —CO—N—CO—NH—: | 3.9% by weight |

Chain extension at 25° C with 17.5 parts by weight (0.10 mol) of 1-amino-3,3,5-trimethyl-5-aminomethyl cyclohexane in 100 g of isopropanol, gives a solution of a polyurethane acyl urea which contains approximately 30% of high molecular weight solids and has a viscosity of 2800 cP at 24° C.

EXAMPLE 13

34 parts by weight (0.02 mol) of an adipic acid-1,6-hexane diol neopentyl glycol polyester having an OH number of 65 are dehydrated for 30 minutes in a water jet pump vacuum at a temperature of 120° C, and subsequently left to react for 30 minutes at that temperature with 34.8 parts by weight (0.2 mol) of a mixture of 2,4- and 2,6-tolylene diisocyanate in a ratio of 8 : 2 (NCO content of the resulting mixture: 21.8% by weight). After dilution with 69.2 parts by weight of toluene, 0.5 parts by weight (4.3 mMol) of a mixture of 1-methyl-1-phospha -2-and 3-cyclopenten-1-oxide are added, followed by the gradual dropwise addition at room temperature of 25 parts by weight (0.125 mol) of lauric acid in 28 parts by weight of toluene after 3.1 liters of carbon dioxide (0.128 mol) have been given off.

Analysis of the dissolved product (all percentages relate to solid substance):

| | |
|---|---|
| —NCO: | 3.5% by weight |
| —N=C=N: | 0.9% by weight |
| —CO—N—CO—NH—: | 11.5% by weight |

After chain extension with 13.35 parts by weight (0.05 mol) of 3,3'-dichloro-4,4'-aminodiphenyl methane in 87.5 parts by weight of toluene at 25° C, 20 parts by weight of n-propanol are stirred in and a polymer solution having a solids content of 26% is obtained.

EXAMPLE 14

Production of the polyester diisocyanate prepolymer is carried out as in Example 7. The lauric acid is replaced by 36.8 parts by weight (0.2 mol) of 10-undecenoic acid, dissolved in 40 parts by weight of xylene. Chain extension with 17 parts by weight (0.1 mol) of 1-amino-3,3,5-trimethyl-5-aminomethyl cyclohexane at 25° C gives a solution of polyurethane acyl urea having a viscosity of 1865 cP.

Although the invention has been described in detail in the foregoing for the purpose of illustration, it is to be understood that such detail is solely for that purpose and that variations can be made therein by those skilled in the art without departing from the spirit and scope of the invention except that as it may be limited by the claims.

What is claimed is:

1. A process for the production of polyureas by reacting organic polyisocyanates with diamines, optionally in the presence of other compounds with more than one isocyanate-reactive hydrogen atom per molecule wherein the NCO/NH molar ratio is between about 0.4:1 and 1.1:1 and the polyisocyanates used are polyisocyanates which have an NCO content of about 0.5 to 25% by weight, an acylated urea group (-CO-N-CO-NH-) content of about 0.5 to 50% by weight and a carbodiimide group (—N=C=N—) content of from about 0 to 25% by weight.

2. A process as claimed in claim 1, wherein diisocyanates are used as the organic polyisocyanates.

3. A process as claimed in claim 1, wherein the reaction is carried out in the presence of solvents.

4. The use of the polyureas obtained in accordance with claim 1 for the production of coatings, lacquer finishes and impregnations.

5. In a process for the production of polyureas comprising reacting organic polyisocyanates with diamines at a NCO/NH molar ratio between about 0.4:1 and 1.1:1, the improvement comprising using polyisocyanates having
   i. an NCO content of about 0.5 to 25 wt. %,
   ii. an acylated urea group (—CO—N—CO—NH—) content of about 0.5 to 50 wt. %, and
   iii. a carbodiimide group (—N=C=N—) content of about 0 to 25 wt. %.

6. In the process of claim 5 the further improvement wherein the polyisocyanates are prepared from mixtures of monomeric diisocyanates and prepolymers containing terminal isocyanate groups which mixtures are obtained by reacting monomeric diisocyanate with polyhydroxyl compounds at a molar NCO/OH ratio of about 2:1 to about 15:1.

7. In the process of claim 5 the further improvement wherein the polyisocyanates are prepared from isocyanates selected from the group consisting of 1,4-tetramethylene diisocyanate, 1,6-hexamethylene diisocyanate, 1-isocyanato-3,3,5-trimethyl-5-isocyanato methyl cyclohexane, m-xylylene diisocyanate and 4,4'-diisocyanato dicyclohexyl methane, 4,4'-diisocyanato diphenyl methane, 1,3-phenylene diisocyanate, 1,4-phenylene diisocyanate, 4,4'-diisocyanate diphenyl ether, 1,5-naphthylene diisocyanate, 1-methoxy-phenyl-2,4-diisocyanate, 4,4'-biphenylene diisocyanate, 3,3'-dimethoxy-4,4'-biphenyl diisocyanate, 3,3'-dimethyl-4,4'-biphenyldiisocyanate, 3,3'-dimethyldiphenyl methane-4,4'-diisocyanate, 2,4- and 2,6-tolylene diisocyanate or any mixture of these isomers, and polyphenyl-polymethylene-polyisocyanates of the type obtained by condensing aniline with formaldehyde, followed by phosgenation.

8. In the process of claim 7 the further improvement wherein the polyisocyanate is prepared from isocyanates selected from the group consisting of 2,4- and 2,6-tolylene diisocyanate or any mixture of these isomers, and polyphenyl-polymethylene-polyisocyanates of the type obtained by condensing aniline with formaldehyde, followed by phosgenation.

9. In the process of claim 5 the further improvement wherein the polyisocyanate is prepared from NCO terminated prepolymers prepared by reacting organic isocyanates with alkane diols and/or triols having molecular weights below about 200.

10. In the process of claim 5 the further improvement wherein the polyisocyanate is prepared from a NCO terminated prepolymer prepared by reacting organic isocyanates with polyhydroxyl polyesters or polyhyroxyl polyethers.

11. In the process of claim 10 the further improvement wherein the polyesters or polyethers are dihydroxyl bearing and have molecular weights of about 400 to 4000.

12. A process for the production of polyurea comprising
   a. reacting organic diisocyanate with a polyhydroxyl compound at an NCO to OH ratio of about 1.5 to 2.3 to form a prepolymer,
   b. adding an aromatic diisocyanate to the prepolymer in 1 to 3 times the molar amount of the diisocyanate used in the prepolymer formation,
   c. carrying out a carbodiimide-forming reaction at 0° to 200° C with the addition of a carbodiimide forming catalyst and then making an addition of carboxylic acid such that the resulting prepolymer has an acylated urea group content of about 0.5 to 50 wt. %, and
   d. reacting said prepolymer with diamines at an NCO/NH molar ratio between about 0.4:1 and 1.1:1.

13. The process of claim 12 wherein
   a. the NCO to OH ratio is about 1.8 to 2.0,
   b. the diisocyanate used in forming the prepolymer of step (b) is an aliphatic diisocyanate, and
   c. the carboxylic acids used in step (c) correspond to the general formula

in which
   R represents an aliphatic hydrocarbon radical with 1 to 18 carbon atoms optionally containing olefinic double bonds, a cycloaliphatic hydrocarbons radical with 6 to 19 carbon atoms optionally containing olefinic double bonds, an aromatic hydrocarbons radical with 6 to 14 carbon atoms or an araliphatic hydrocarbon radical with 7 to 14 carbon atoms, and
   a is an integer from 1 to 3.

14. The process of claim 13 wherein $a$ is equal to 1 and R is a $C_1$ to $C_{17}$ aliphatic hydrocarbon radical.

15. The process of claim 12 wherein
   a. the carbodiimide catalyst is present in an amount equivalent to 1/100 to 2/10 of the molar quantity of the aromatic diisocyanate of step (b),
   b. the carboxylic acid is added after the evolution of about 50 to 95 mol % of carbon dioxide based on 100% representing the theoretical total conversion of all NCO groups present to carbodiimide groups, and
   c. the carboxylic acid is added in amounts of about 0.2 to 1.2 mols of carboxyl groups per mol of carbon dioxide liberated.

16. The process of claim 15 wherein about 0.5 to 1.2 mols of carboxyl group is added per mol of carbon dioxide liberated.

17. The process of claim 1 wherein
   a. the diamine is selected from the group consisting of diprimary diamines, disecondary diamines and primary-secondary diamines,
   b. the NCO to NH ratio is between about 0.4 : 1 and 1.1 : 1, and
   c. the diamine addition reaction occurs at temperatures between about 0° and 80° C.

18. The process of claim 17 wherein
   a. the NCO to NH ratio is about 1 : 1,
   b. the diamine addition reaction occurs at temperatures between about 15° and 30° C, and
   c. the diamine is selected from the group consisting of hydrazine hydrate, N,N-dimethyl hydrazine, 1-amino-3,3,5-trimethyl-5-aminomethyl cyclohexane, hexamethylene diamine, m-xylylene diamine, 4,4-diamino dicyclohexyl methane, trimethyl hexamethylene diamine and 1-methyl-2,4-diamino cyclohexane.

19. The process of claim 17 wherein the diamines used have the general formula

in which:
   A represents an aliphatic hydrocarbon radical with 2 to 18 carbon atoms, an aromatic hydrocarbon radical with 6 to 15 carbon atoms, a cycloaliphatic hydrocarbon radical with 5 to 15 carbon atoms or an araliphatic hydrocarbon radical with 7 to 15 carbon atoms,
   R' represents hydrogen or an aliphatic hydrocarbon radical with 1 to 4 carbon atoms, and
   $n = 0$ or 1.

20. The process of claim 19 wherein the diamines are selected from the group consisting of hydrazine hydrate, N,N-dimethyl hydrazine, 1-amino-3,3,5-trimethyl-5-aminomethyl cyclohexane, hexamethylene diamine, m-xylylene diamine, 4,4-diamino dicyclohexyl methane, trimethyl hexamethylene diamine and 1-methyl-2,4-diamino cyclohexane.

21. The product of the process of claim 1.

22. A binder for powder lacquers comprising a polyurea powder produced by the process of claim 1.

23. A coating solution comprising a polyurea powder produced by the process of claim 1 dissolved in a lacquer solvent.

* * * * *